United States Patent Office 3,361,775
Patented Jan. 2, 1968

3,361,775
TRIORGANOSTANNOXY ZIRCONIUMTRIAL-COHOLATES AND DERIVATIVES
Ambrose J. Gibbons, Jr., Catonsville, and Richard E. De Marco, Severna Park, Md., assignors, by mesne assignments, to SCM Corporation, New York, N.Y., a corporation of New York
No Drawing. Filed Nov. 10, 1964, Ser. No. 410,295
5 Claims. (Cl. 260—408)

ABSTRACT OF THE DISCLOSURE

Novel stannoxy zirconium compounds are presented wherein the characterizing linkage is $\equiv$Sn—O—Zr$\equiv$ or ($\equiv$SnO—)$_2$Zr$=$. Substituents for the tin atom are the $C_{1-12}$ hydrocarbyl radicals alkyl, alkenyl, and phenyl. Substituents for the zirconium atom are $C_{1-18}$ alkoxy, $C_{1-19}$ acyloxy, and their analogues wherein fluorine is substituted for hydrogen. Also presented are the foregoing stannoxy zirconium compounds wherein one or more of the acyloxy or alkoxy radicals attached to the zirconium atom is replaced by a β-amino alcohol residue such as $$OCH_2CH_2NHCH_2CH_2O$$

i.e., diethanolamine free of its hydroxyl hydrogen atoms.

---

This invention relates to novel compounds in which the characterizing linkage is $\equiv$Sn—O—Zr$\equiv$ or ($\equiv$SnO—)$_2$Zr$=$ The three valences of the tin in these linkages can be satisfied with a variety of alike or different monovalent hydrocarbyl groups such as alkyl, alkenyl, alkynyl, aryl, alkaryl, aralkyl, cycloaliphatic and like groups containing 1–12 carbons. The two or three valences of the zirconium in said characterizing linkages can be satisfied with a variety of alike or different —OR groups or $$\overset{O}{\underset{\|}{R C}}-O-$$

groups wherein R can be any alkyl or fluoroalkyl group of 1–18 carbons.

The novel compounds are useful as agents conferring water-repellency to porous materials such as cloth, paper, concrete, wood, asbestos-cement articles, ceramics, and the like. They also exhibit fungicidal properties, and in addition function well as catalysts for a variety of organic reactions, e.g. as curing catalysts for urethane foams.

Accordingly, it is an object of this invention to provide novel compounds, characterized by the linkage $\equiv$Sn—O—Zr$\equiv$ or ($\equiv$SnO—)$_2$Zr$=$.

A further object is to provide porous articles which have been rendered water-repellent by treatment with one or more of said novel compounds.

Another object is to provide articles which have been rendered bacteriostatic by treatment with said novel compounds.

A further object is to provide improved urethane foams through the use of one or more of said novel compounds as curing catalyst(s).

These and related objects will be understood from the foregoing and following description of the invention.

The alcoholates of the invention can be prepared in various manners, but we prefer the method wherein a triorganotin ester of a lower aliphatic acid is reacted with a zirconium tetraalcoholate whose —OR groups correspond to those wanted in the finished compound. Where one mole of the ester is reacted with one mole of the tetraalcoholate, the resulting compound has the linkage $\equiv$Sn—O—Zr$\equiv$. Where two moles of the ester are reacted with the tetraalcoholate, the resulting compound has the linkage ($\equiv$Sn—O—)$_2$Zr$=$. These reactions are quantitative and the by-products are lower aliphatic acid esters of the displaced alcoholate groups. Thus the general formula representing the reaction is as follows:

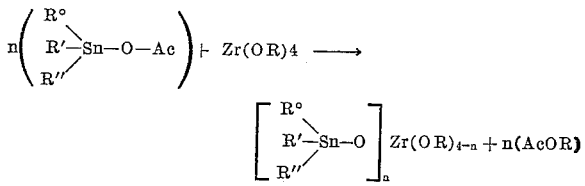

wherein R, R°, R' and R'' are as identified above, and wherein Ac represents a monovalent aliphatic acyl group of 1–6 carbons.

The reaction can be carried out by merely heating the reactants together in a dry, protective atmosphere or by similarly heating them in the presence of suitable inert, volatile organic solvent(s). The by-products of the reactions can be stripped off subsequently along with any solvent or portion of any solvent used. The heating to effect reaction can be a temperature between about 60 and 150° C.

The following Examples illustrate the principles of the invention and include the best modes presently known to us for practicing the invention is accordance with those principles.

In the examples, the following abbreviations are sometimes used in equations to identify the indicated radicals:
Me—methyl
Pr—isopropyl
Bu—butyl
Ph—phenyl

EXAMPLE 1

*Tributylstannoxy zirconium tri-n-butoxide*

Zirconium butoxide (0.1 mole) as a 30% solution in xylene and tributyltin acetate were heated together in a 250 ml. round bottom flask in a protected atmosphere driving off a colorless liquid which contained both ester and alcohol, finally heating under vacuum at 90° C./0.5 mm. to remove final traces of ester. The residue was a clear light tan liquid, $n_D^{24}$ 1.4892, $d_4^{24}$ 1.2020 which exhibits medium absorption at 6.4–6.7 and strong at 8.7 microns.

Calcd: Sn, 19.25; Zr, 14.79. Found: Sn, 19.15; Zr. 16.07.

Molecular weight (ebullioscopic in benzene), 677.8; calcd. monomer, 616.6.

The tributyltin acetate used above was prepared in the following manner.

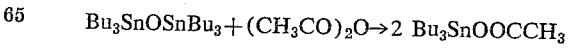

Acetic anhydride 20.4 g. (0.2 mole) was added to tributyltin oxide 119.2 g. (0.2 mole). The reaction is exothermic. Solution takes place at approximately 80° C. and the temperature was held at 110 C. for 1 hour. The liquid was poured into a crystallizing dish and gave 138 gms. (99%) light yellow solid, M.P. 83.5–84.5° C.

Calcd: Sn, 34.01. Found: Sn, 34.94.

The material can be recrystallized from petroleum ether or hexane.

EXAMPLE 2

*Tributylstannoxy zirconium triisopropoxide*

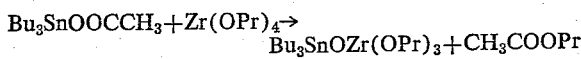

Using the same general procedure as in Example 1, tributyltin acetate (0.173 mole) and 0.173 mole of tetraisopropyl zirconate were heated in an oil bath at a pot temperature of 105–110° C. Colorless ester 14.6 gms. (78.5%) distilled off. Additional 4.0 g. liquid was obtained by heating under reduced pressure. All fractions, $n_D^{24}$ 1.5165, $d_4^{25}$ 1.3375 exhibited strong absorption at 6.4, 8.6 and 9.8 microns.

Calcd.: Sn, 20.66; Zr, 15.88. Found: Sn, 20.61; Zr, 20.79.

Molecular weight, ebullioscopic (benzene), 1173.7; calcd. monomer, 574.5.

EXAMPLE 3

*Trimethylstannoxy zirconium tributoxide*

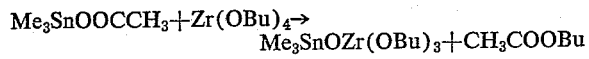

Trimethyltin acetate 22.2 g. (0.1 mole) and tetrabutylzirconate (0.1 mole) were combined in a 100 ml. round bottom flask equipped for distillation and heated under a dry atmosphere 1¼ hours at 140–165°, then ½ hour to 180° C. During this time a colorless liquid distilled off leaving as residue a dark colored liquid which is essentially trimethylstannoxy zirconium tri-n-butoxide.

In the preferred procedure, toluene was used as solvent and by-product ester removed by azeotropic distillation. The product was obtained as a toluene solution.

The trimethyltinacetate was prepared in the following manner (70–A–79):

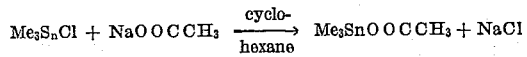

Trimethyltin chloride (0.2 mole) dissolved in 100 ml. cyclohexane was added over a 2 hour period to a heated suspension of 28.7 g. (0.35 mole) sodium acetate in 750 ml. cyclohexane. Reaction was refluxed an additional hour after completion of addition. The precipitate was filtered through a large Buchner funnel. The filtrate was evaporated but contained no product. Repeated Soxhlet extraction of the filter cake gave 33.0 gms. (75%) product which sublimes at 190–195° C. in a sealed tube.

Calcd. for $C_5H_{12}O_2Sn$: Sn, 53.4; Sap. No. 251. Found: Sn, 52.84; Sap. No. 248.

In a more desirable preparation xylene was used as solvent and filtered hot after completion of the reaction. Upon cooling, the xylene deposits pure trimethyltin acetate in 92% yield.

EXAMPLE 4

*Triphenylstannoxy zirconium triisopropoxide*

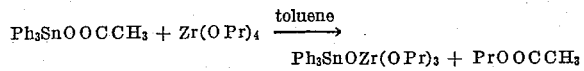

Triphenyltin acetate (0.1 mole) and tetraisopropyl zirconate (0.1 mole) were combined in toluene under dry conditions and refluxed for two hours. Toluene and by-product isopropyl acetate were slowly removed by distillation through a 30-cm. packed column maintaining the toluene level in the reaction vessel by addition of toluene. The distillation was continued until only pure toluene appeared as distillate. The residue solution contained essentially triphenylstannoxy zirconium triisopropoxide. A two percent solution imparts water repellency to paper.

EXAMPLE 5

*Triphenylstannoxy zirconium tributoxide*

Purified triphenyltin hydroxide (0.1 mole) and tetrabutylzirconate (0.1 mole) as a 30% solution in xylene were heated together for 2½ hours at 60° C. pot temperature in an inert atmosphere. Vacuum (0.1–4 mm.) was applied and solvent and by-product alcohol removed over a 2 hour period maintaining the bath temperature at 60–80° C. The residual liquid consisted essentially of triphenylstannoxy zirconium tributoxide.

EXAMPLE 6

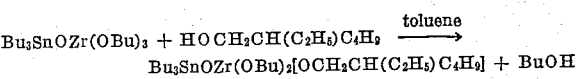

Tributylstannoxy zirconium tributoxide (0.1 mole) was reacted with 2-ethylhexanol (0.1 mole) in refluxing toluene and the reaction driven to completion by removal of by-product butanol as a toluene azeotrope. The product was obtained as a toluene solution and was an effective water repellant at 2% concentration.

EXAMPLE 7

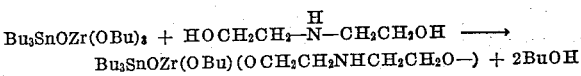

Tributylstannoxy zirconium tributoxide (0.1 mole) and diethanolamine (0.1 mole) were reacted in toluene by the same procedure as described in Example 6. The resultant solution contains the diethanolamine zirconate product and it is assumed to be partially polymeric.

EXAMPLE 8

*Tributylstannoxy diisopropoxy zirconium perfluorooctanoate (A)*

This derivative may be prepared by either of two methods:

(1)

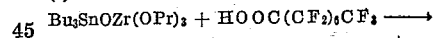
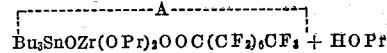

(2)

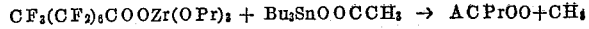

Method 2 is the preferred method and the reaction is generally conducted in solvent. When the product is to be used as a water or oil repellent or as a textile finish, the product is not isolated but used directly as a solution in the desired hydrocarbon after dilution.

Tetrapropylzirconate (0.1 mole) and perfluorooctanoic acid were combined in 600 ml. toluene and the mixture was refluxed for two hours. Toluene was then distilled through a 30-cm. packed column to remove the by-product alcohol as an azeotrope. Thereafter, tributyltin acetate is added (0.1 mole) and the process is repeated. When all the propylacetate is removed by azeotropic distillation, the product is essentially tributylstannoxy diisopropoxy zirconium perfluorooctanoate and is used as a solution after dilution to the proper concentration.

In the manner of Method 1, the triorganostannoxy zirconium alcoholates of the invention can be reacted with higher alcohols, glycols, aminoalcohols, fluorohydrocarbyl alcohols, and the corresponding acids to prepare desired derivatives.

EXAMPLE 9

The compound prepared in Example 1 (tributylstannoxy zirconium tri-n-butoxide) was used in standard water-repellency tests. The following table summarizes the results.

TABLE I.—WATER-REPELLENCY TESTS

| Material | Weight Applied [a] | Fotosize Penetration (sec.) [b] | | | Cobb Test [c] (g. per m²) | |
|---|---|---|---|---|---|---|
| | | Water | 0.3N NaOH | .03N HCl | | |
| Comp. of Ex. 1 | [d] 0.53 | >1,800 | 63 | 1,288 | 25.4 | 26.6 |
| Blank | None | 0 | 0 | 0 | | |

[a] In pounds per 3,000 square feet.
[b] Special handsheets containing 75% hardwood pulp and 25% softwood pulp are prepared in the Paper Laboratory. A 3½" x 7" sheet of this paper is dipped into the water repellent solution, removed and rolled free of excess solvent with a hard rubber roller on a glass surface. The handsheets are then air dried and conditioned at 73° F. and 50% relative humidity for one day. The treated paper is placed under the surface of a reservoir of water in the Twing-Albert Fotosize Penetration Tester and the number of seconds required to effect wetting or penetration is recorded. This time is automatically recorded by a timer shut-off actuated by minimum light transmittance through the paper. Feathering ink, aqueous base, or aqueous acid can be substituted for the plain water. Feathering ink is prepared by combining: 6 grams blue dye (National 2 BEX), 250 ml. water at 120° F., 6 ml. hydrochloric acid. Cool to 70° F. and dilute to a total volume of 950 ml.
[c] TAPPI Standards and Suggested Methods; T-441 M-60; (Technical Association of the Pulp and Paper Industry). A five minute exposure test is used, and the weight of water absorbed per square meter of paper is reported. Paper can be 0.0004 mil and over in thickness.
[d] Applied to paper in the form of 2% (wt.) solutions in toluene.

EXAMPLE 10

(Table IX of Part VII)

The compound of Example 1 was screened for fungicidal activity by the serial dilution technique. The compound was tested against each of six fungi. The range of compound concentration, expressed as percent active ingredient, was .0078% through 0.000015%. All tests were performed in Difco Sabourand Liquid Medium at 25° C. The tests were incubated for seven days.

| Fungus | $Bu_3SnOZr(OBu)_3$ Minimum Inhibitory Concentration (%) |
|---|---|
| Aspergillus niger | 0.000125 |
| Botrytis allii | 0.000031 |
| Chaetomium globosum | 0.000004 |
| Glomerella cingulata | 0.000062 |
| Pullularia pullulams | 0.00025 |
| Penicillium italicum | 0.000016 |

EXAMPLE 11

The compound of Example 1 was tested as a urethane foam catalyst.

To prepare the foams, 200 grams of polyether resin [1] are weighed into a paper drinking cup and 3.0 grams (3.25 ml.) of silicone oil (dimethyl polysiloxane) and 0.6–1.0 g. of catalyst are added and mixed for two minutes with a 3-prop lightning mixer.

Diethylene triamine (0.2 gram) and N-ethylmorpholine (0.3 gram) are dissolved in 7.4 grams water in a small beaker. This mixture is combined with the polyether mix and stirred for one minute.

Toluene diisocyanate (96.4 grams) is poured into the above mix while stirring and mixed for seven seconds while rotating the cup. The cup is dropped while stirring and with the same motion poured rapidly into a 12" x 12" carton.

The stopwatch is started at the time of pouring and the time in seconds for the foam to obtain maximum rise is recorded as "rise time." A control catalyst, stannous octoate, gives a rise time of 50–90 seconds.

The following table summarizes the results:

TABLE II.—TESTS FO URETHANE FOAM CATALYSTS

| Material | Wt. in grams | Rise Time (Sec.) | Color | Max. Internal Temp. (° C.) | Catalyst Rating |
|---|---|---|---|---|---|
| Comp. of Ex. 1 | 0.8 | 77 | White | 116 | Excellent. |
| Comp. of Ex. 1 | 0.4 | 100 | do | 115 | Good. |

[1] Niaz Triol LG 56 (T.M.); glycol polyether resin having an average molecular weight of about 3000, an average hydroxyl number (mg. KOH per gram) of 56.

Having described our invention, what we claim is:

1. Triorganostannoxy zirconium compounds corresponding to the formula

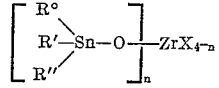

wherein R°, R', and R" can be like or different $C_{1-12}$ alkyl, alkenyl, or phenyl radicals, and wherein X is a radical selected from the group consisting of —OR and

the R in said X radical being $C_{1-18}$ alkyl or fluoro-substituted alkyl.

2. Tributylstannoxy zirconium triisopropoxide.
3. Tributylstannoxy zirconium tri-n-butoxide.
4. Triphenylstannoxy zirconium tri-n-butoxide.
5. Tributylstannoxy diisopropoxy zirconium perfluorooctanoate.

References Cited

UNITED STATES PATENTS 3,299,109  1/1967  Sander _____ 260—408

ALEX MAZEL, *Primary Examiner.*

R. GALLAGHER, *Assistant Examiner.*